United States Patent [19]

Schmidt et al.

[11] Patent Number: 4,830,326
[45] Date of Patent: May 16, 1989

[54] VEHICLE DOOR MOUNTED DUAL MIRROR ASSEMBLY

[75] Inventors: William P. Schmidt, Rockwood; Frank D. Hutchinson, New Boston, both of Mich.

[73] Assignee: Mirror Lite Company, Rockwood, Mich.

[21] Appl. No.: 81,796

[22] Filed: Aug. 5, 1987

[51] Int. Cl.$^4$ .............................................. B60R 1/06
[52] U.S. Cl. .................................. 248/479; 350/616; 350/632
[58] Field of Search ............... 248/466, 475.1, 476, 248/479, 480, 485, 486, 487, 278, 279; 350/604, 606, 616, 626, 631, 632, 636, 639

[56] References Cited

U.S. PATENT DOCUMENTS

| | | | |
|---|---|---|---|
| 2,458,117 | 1/1949 | Tolbert | 248/279 |
| 2,751,817 | 6/1956 | Lapekas | 248/486 |
| 2,783,015 | 2/1957 | Kampa | 248/279 |
| 2,807,985 | 10/1957 | Beach | 248/279 |
| 2,860,546 | 11/1958 | Bolser | 248/486 |
| 3,189,309 | 6/1965 | Hager | 248/486 |
| 3,282,549 | 11/1966 | Crawford | 248/486 |
| 3,322,388 | 5/1967 | Budreck | 248/486 |
| 3,371,903 | 3/1968 | Thompson | 248/486 |
| 3,384,334 | 5/1968 | Malachowski | 248/487 |
| 3,424,424 | 1/1969 | Kelley | 350/616 |
| 3,596,079 | 7/1971 | Clark | 248/486 X |
| 3,671,005 | 6/1972 | Schultz | 248/480 |
| 4,165,156 | 8/1979 | O'Connell | 248/486 X |
| 4,500,063 | 2/1985 | Schmidt | 248/475.1 |

FOREIGN PATENT DOCUMENTS 1090986 10/1960 Fed. Rep. of Germany ...... 248/487
2929076 2/1981 Fed. Rep. of Germany ... 248/475.1

Primary Examiner—Alvin C. Chin-Shue
Assistant Examiner—Robert A. Olson
Attorney, Agent, or Firm—Arnold S. Weintraub

[57] ABSTRACT

A dual outside mirror assembly for mounting dual mirrors on a vehicle door having a window includes a two part tubular frame in which an upper tubular frame member may be rotated about a vertical axis relative to a lower tubular frame member whose lower end in turn is mounted for rotative adjustment relative the vehicle door about the same vertical axis. The upper frame member is mounted on the vehicle door above the window for rotative adjustment about a horizontal axis to enable the frame to be conformed to doors of various configurations. The tubular frame includes a vertically extending offset section upon which two mirrors are mounted one above the other for rotative adjustment relative to the tubular frame about at least one vertical axis and independently about individual horizontal axes.

9 Claims, 3 Drawing Sheets

VEHICLE DOOR MOUNTED DUAL MIRROR ASSEMBLY

BACKGROUND OF THE INVENTION

The present invention is directed to a dual outside mirror assembly adapted to be mounted on a vehicle door having a window.

While not limited to this specific application, the dual mirror assembly of the present invention is especially well adapted for use on van type vehicles, pick-up trucks carrying a camper, and other vehicles where rearward visibility from the drivers seat is restricted. Dual outside mirror assemblies enables the drivers of such vehicles to have a field of view which is substantially extended in the vertical direction over that provided by a single mirror, a substantial advantage when the vehicle must be backed into areas of restricted clearance. Two plane mirrors may be adjusted into two different vertical planes to provide overlapping fields of view or a plane mirror may be used in combination with a convex mirror to combine the expanded field of view of the convex mirror with the undistorted view of the plane mirror.

To minimize problems of side clearance, dual mirrors are conventionally mounted one above the other on a vertically extending frame member supported in outwardly spaced relationship to the side of the vehicle. In nearly all vehicles, the only practical location for mounting the mirror support frame is on the vehicle door so that the mirrors will be visible to the driver through the front door windows. This requires the mirror mounting frame to be attached to the door at locations above and below the door window. In the prior art this is typically accomplished by the use of flat plate-like brackets bolted to the door and fixedly attached, in some manner, to the outwardly extending frame at the top and bottom of the mirror support frame.

In most vehicles, that portion of the door which extends across the top of the window is relatively narrow, thus restricting the vertical dimension of the mounting plate employed at this location which in turn presents problems in establishing a rigid connection between this plate and the upper end of the mirror support frame. The door on which the mirror mount is mounted is not always closed gently and this, combined with bumps and vibrations encountered during normal operation of the vehicle places substantial stresses on the point of connection between the mirror mounting frame at its point of connection to the mounting plates which attach the frame to the vehicle door.

A second problem encountered by dual mirror mounting frames is the fact that in nearly all present day vehicles the outer side surface of the door does not lie in a true vertical plane, but is instead curved upwardly and inwardly toward the top of the vehicle. Thus, the top of the door normally is horizontally displaced inwardly of the vehicle from that portion of the door below the window, and this horizontal displacement differs from vehicle to vehicle. A mirror frame designed to support the dual mirrors for adjustment about horizontal and vertical axes when mounted on one vehicle may have its frame tilted when mounted on a different vehicle to the point where the mirror adjustment axes are displaced from the horizontal and vertical to the point where adjustment of the mirror is difficult.

The present invention is specifically directed to a dual mirror assembly which solves the foregoing problems.

SUMMARY OF THE INVENTION

A door mounted dual mirror assembly embodying the present invention includes a two part mirror support frame consisting of tubular upper and lower frame members. The lower tubular frame member is formed with two vertically extending straight sections, one at each end of the member, vertically spaced and lying on a common vertical axis. A central portion of the lower frame member likewise extends vertically, but in horizontally offset relationship to the end sections of the member, and is connected at its upper and lower ends by horizontally extending sections of the tubular member to the respective end sections.

The upper tubular frame member is formed with a vertically extending section at one end which merges into a bent section at its upper end which projects to one side of the vertical end section and is joined at its opposite end to a horizontally extending end section. The upper and lower frame members are coupled to each other by a pin projecting axially from one member into a bore in the other so that the lower frame member may rotate relative to the upper frame member about the common vertical axis of the end sections of the lower frame member.

The horizontal end section of the upper frame member is seated and clamped to an elongate mounting base member bolted to and extending horizontally along a vehicle door above its window. A so-called catspaw type clamp firmly clamps the horizontal end section of the upper frame member into an elongate horizontally extending recess on the door mounted base member. The upper frame member can thus be adjusted about a horizontal axis to accommodate mounting the assembly on vehicle doors of different configurations.

The lower end section of the lower frame member is mounted in a generally similar clamping assembly mounted on the vehicle door below the window. This lower clamping assembly accommodates rotative adjustment of the lower frame member relative to the upper frame member and to the door about the common vertical axis of the opposite ends of the lower frame member.

The dual mirrors are mounted upon the offset center section of the lower frame member for adjustment about vertical and horizontal axes. In the particular form of mirror mounting disclosed in the present application, a tubular member is formed with vertically spaced parallel horizontally extending upper and lower end sections integrally joined to each other by a vertically extending intermediate section. The mirrors are mounted respectively on the horizontal sections of this last tubular member for rotative adjustment about the axes of the horizontal sections. The vertically extending intermediate section of the tubular member is mounted upon the central section of the lower mirror support frame member by a two part clamp, each part having two horizontally spaced concave recesses conformed to seat on the central section and intermediate section of the frame and tubular member, one member being disposed at each side of the two sections. The two members are firmly clamped against the central and intermediate sections by nut and bolt assemblies passing through the two clamping members. This arrangement enables the mirrors to be adjusted about two spaced parallel vertical axes.

Other objects and features of the invention will become apparent by reference to the following specification and the drawings.

IN THE DRAWINGS

FIG. 4 is a detail cross-sectional view taken on line 4—4 of FIG. 2;

FIG. 5 is a detail cross-sectional view taken on line 5—5 of FIG. 2; and

FIG. 6 is a detail cross-sectional view taken on line 6—6 of FIG. 2.

Figure 1:
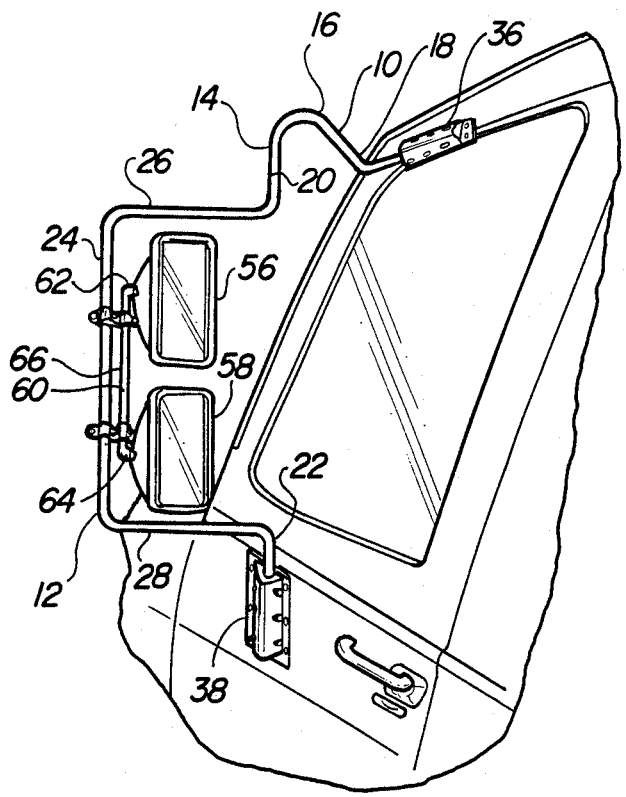
FIG. 1 is a perspective view of a dual mirror assembly embodying the present invention showing the assembly mounted upon the driver side door of a vehicle, only a portion of the vehicle being shown.
Figure 2:
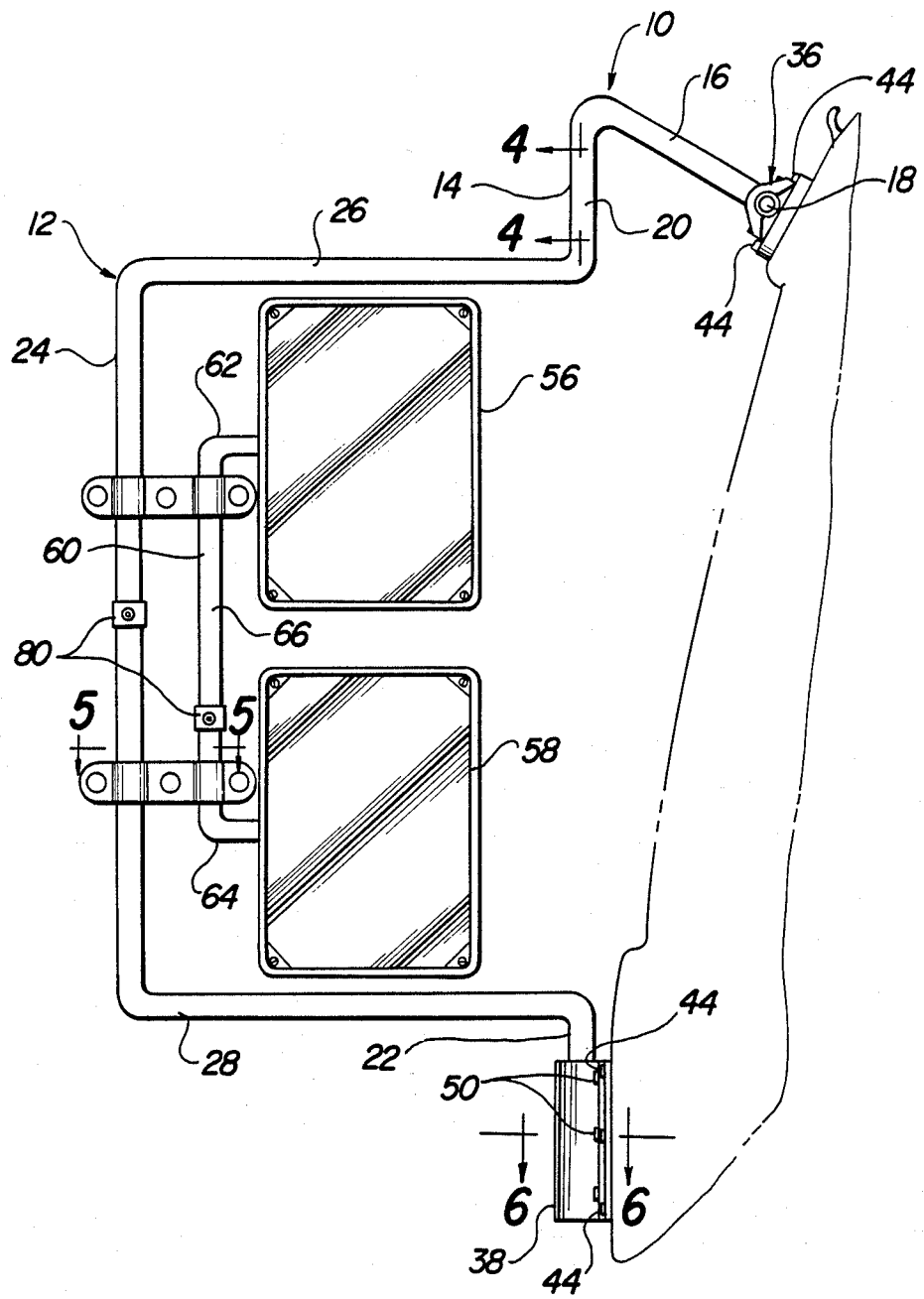
FIG. 2 is a rear view of the dual mirror assembly of FIG. 1 with a portion of a vehicle upon which the assembly is to be mounted indicated in broken line.
Figure 3:
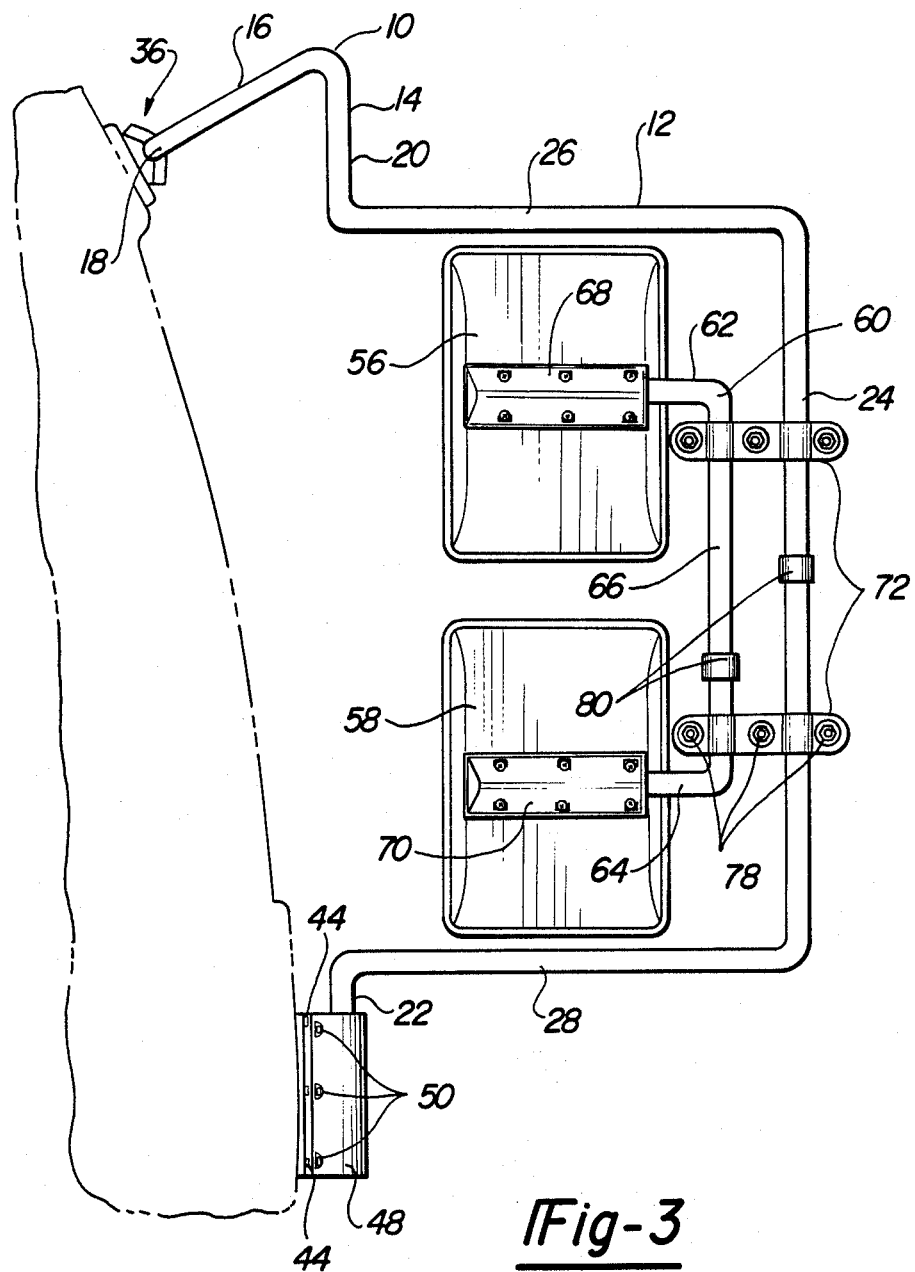
FIG. 3 is a front view of the mirror assembly of FIG. 1 with a portion of a vehicle upon which the assembly is to be mounted indicated in broken line.

As best shown in FIGS. 1-3, a dual mirror assembly embodying the present invention includes a tubular upper mirror support frame member designated generally 10 and a tubular lower mirror support frame member designated generally 12.

Upper frame member 10 includes a vertically extending end section 14 at one end of member 10 which merges at its upper end with a connecting section 16 bent laterally from end section 14 and merging at its opposite end with a horizontally extending end section 18.

Lower support frame member 12 includes vertically extending upper and lower end sections 20, 22 respectively vertically spaced from each other and extending coaxially along a common vertical axis. A vertically extending central section 24 of lower frame member 12 is integrally joined at its upper and lower ends respectively to the upper 20 and lower 22 end sections as by horizontally extending sections 26, 28. Upper and lower frame members 10 and 12 are formed by bending lengths of tubular metal stock into the configurations shown.

Lower frame member 12 is coupled to upper frame member 10 for rotation relative to the upper frame member about a vertical axis by a pin and adaptor coupling best shown in FIG. 4. A pin 30 is fixedly mounted within and projects coaxially from the lower end of end section 14 of upper frame member 10 and is received within a bore 32 in an adaptor 34 fixedly mounted within the upper end section 20 of lower frame member 12. The fit of pin 30 within bore 32 is such that lower frame member 12 may be rotated about the pin 30. Adaptor 34 may be made from a material possessing some resilience so that it may exert a frictional grip upon pin 30 and may also accommodate a slight degree of axial misalignment-i.e., tilt-of the axes of the end sections 14 and 20 of the upper and lower frame members.

The assembled upper and lower frame members 10 and 12 are mounted upon a vehicle door by catspaw type clamping assemblies designated generally 36, 38. A cros-sectional view of clamping assembly 38 is shown in FIG. 6. Assembly 38 includes an alongate base member 40 formed with an open ended concave recess 42 extending longitudinally the entire length of base member 40. Recess 42 is conformed, as best seen in FIG. 6, to partially receive the tubular lower end section 2 of lower frame member 12. Base member 40 is fixedly mounted upon the vehicle door D as by sheet metal screws 44 which pass through bores, not shown, through flanges 46 extending along opposite side edges of base member 40.

A clamping member 48 of generally V shaped transverse cross-section is conformed to overlie tubular end section 22 of the lower frame member and is clamped against end section 22 by a plurality of bolts 50 which pass through bores and member 48 to be threadably received in tapped bores in base member 40. By adjusting bolts 50, the frictional grip exerted upon end section 22 by clamp assembly 38 may be adjusted so that end section 22 may be rotatively adjusted about its longitudinal axis relative to clamp assembly 38. As best seen in FIGS. 1-3, clamp assembly 38 is oriented upon the vehicle door so that end section 22 of lower frame member 12 is disposed with its axis in a vertical position.

Clamp assembly 36 which mounts upper frame member 10 upon the door is of the same construction as clamp assembly 38, with the exception that because clamp assembly 36 must be mounted upon the relatively narrow portion of the door which extends across the top of the vehicle window, the mounting flanges which receive the sheet metal screws 44 employed to attach the clamp to the door project from the opposite ends of the base member of clamp assembly 36, rather than the opposite sides.

When the assembled upper and lower support frames 10 and 12 are mounted upon the vehicle door in the relationship shown in FIGS. 1-3, the lower support frame 12 may be rotatively positioned relative to the vehicle door about the common vertical axis of the upper and lower end sections 20, 22 of lower support frame 12. Frictional resistance to this rotative adjustment may be regulated by tightening or loosening bolts 50 of clamp assembly 38 to increase or decrease the clamping grip applied to lower end section 22 of frame 12. The capability of similarly rotatively adjusting upper frame member 10 about the horizontal axis established by clamp member 36 enables a reasonable amount of compensation to accommodate the assembly to vehicle doors of different degrees of curvature. Where this range of adjustment is insufficient, the angular relationship between vertical end section 14 and connecting section 16 may be changed by bending these two sections toward or away from each other.

The assembled upper and lower frame frame members 10 and 12 are mounted upon the vehicle door by first mounting the upper clamp assembly 36 upon the door and then mounting the assembled upper and lower frame members 10 and 12 in clamp 36 and appropriately locating clamp assembly 38 by using the now mounted and assembled frame members 10 and 12 as a locator.

The clamp assemblies 36 and 38 are so dimensioned as to grip the tubular frame sections 18 and 22 of frame support members 10 and 12 in each case over a length of approximately five inches of the tubular member. The adjustability of the upper and lower frame members 10 and 12 accommodated by clamp assemblies 36 and 38 is normally employed only in establishing an initial assembled orientation of the assembled frame members 10 and 12 to the vehicle door which is intended to be a permanent position. Thus, the clamp assembly 36 will normally be tightened to a point where the upper frame member 10 is held in a fixed relationship relative to the door. This provides an extremely rigid interconnection between upper frame member 10 and the relatively narrow portion of the door above the window because of the substantial area of engagement between frame member 10 and the upper clamp assembly 36.

Lower clamp assembly 38 likewise is set quite tightly, however, on occasion it may be desired to swing the central section 24 of lower member 12 in toward the vehicle temporarily if side clearance problems are encountered.

The dual mirrors 56, 58 are supported from central section 24 of lower frame member 12 as best seen in FIGS. 1-3. While various arrangements for mounting the mirrors 56 and 58 on the tubular central section 24 may be employed, a preferred arrangement for so mounting the mirrors utilizes a tubular mounting member designated generally 60 which is bent into a generally U-shaped configuration having horizontally extending upper and lower arms 62, 64 interconnected by a vertically extending intermediate section 66. A catspaw type clamp assembly designated generally 68 and 70 (see FIG. 3) is located on the non reflective side of the respective mirrors 56, 58 to receive and clamp the mirrors on the respective upper and lower arms 62, 64 for rotative adjustment relative to member 60 independently about horizontal axes. The design of clamp assemblies 68, 70 is essentially the same as that of clamp assembly 38 except that the base portion, analogous to base 40 of clamp 38, may be formed integrally upon the mirror frame.

The assembled mirrors and mirror mount 60 are mounted upon center section 24 of lower frame member 12 by a pair of like two part clamps designated generally 72. As best seen in the cross-sectional view of FIG. 5, each two part clamp 72 consists of two separate clamp plates 74, each formed with a pair of concave recesses 76. The members 74 are positioned in opposed facing relationship on opposite sides of the central section 24 of frame member 12 and intermediate section 66 of mirror mount 60, as shown in FIG. 5, and clamped in position by nut and bolt sets 78 which pass through bores in the members 74.

This mounting arrangement enables adjustment of mirrors 56, 58 about two spaced vertical axes, one of these axes being the axis of central section 24 of upper frame member 12 and the other being the vertical axis of intemediate section 66 of mirror mount 60. This arrangement enables the mirrors 56, 58 not only to be titled about a vertical axis to adjust the field of view visible to the driver of the vehicle, but also to be positioned, within a reasonable range, forwardly or rearwardly of the vehicle to suit the drivers convenience.

One or both of central section 24 of lower frame member 12 and section 66 of mirror mount 60 may be provided with a vibration damper 80 of the type disclosed in our co-pending application Ser. No. 026,901, filed Mar. 17, 1987.

While one embodiment of the invention has been described in detail, it will be apparent to those skilled in the art the disclosed embodiment may be modified. Therefore, the foregoing description is to be considered exemplary rather than limiting, and the true scope of the invention is that defined in the following claims.

We claim:

1. A dual outside mirror assembly adapted to be mounted upon a vehicle door having a window, said mirror assembly comprising a tubular upper frame member having a straight horizontal end section at one end and a straight vertical end section at its opposite end horizontally offset from said horizontal section, tubular lower frame member having straight upper and lower end sections at its opposite ends located at vertically spaced positions on a common vertical axis and an elongate vertical center section joined at its upper and lower ends respectively to said upper and lower end sections in parallel horizontally offset relationship thereto, means coupling said vertical end section of said upper frame member to the upper end section of said lower frame member for pivotal movement relative to said lower frame member about said common vertical axis, first means for mounting the horizontal end section of said upper frame member upon a vehicle door above its window for frictionally resisted rotation relative to the door about the horizontal axis of said horizontal end section; second means for mounting said lower end section of said lower frame member upon the vehicle door below its window for frictionally resisted rotation relative to said door about said common vertical axis; third means for mounting a first and second mirror upon said center section of said lower frame member comprising first and second elongate horizontal tubular member; and fourth means comprising a second vertical member for mounting said first and said second elongate, horizontal tubular members upon said center section of said tubular lower frame member.

2. The invention defined in claim 1 wherein at least one of said first and second means comprises an elongate base member adapted to be fixedly mounted on a vehicle door, means defining an elongate concave recess in said base member adapted to receive an end section of one of said tubular frame members, and adjustable clamp means mounted on said base member for clamping an end section of one of said frame members against said base member within said recess.

3. The invention defined in claim 1 wherein said third means comprises a first elongate tubular member, first mirror mounting means mounting said first mirror upon said first elongate tubular member for rotative adjustment relative to said first elongate tubular member about a horizontal axis, a second elongate tubular member, second mirror mounting means mounting said second mirror on said second elongate tubular member for rotative adjustment relative to said second elongate tubular member about a horizontal axis, and fourth means comprising a second vertical member for mounting said first and said second elongate tubular members upon said center section of said tubular lower frame member for rotative adjustment relative to said lower frame member about at least one vertical axis.

4. The invention defined in claim 3 wherein said fourth means comprising a second vertical member which is an elongate vertical tubular section integrally joined at its opposite ends to said first and said second elongate, horizontal tubular members.

5. The invention defined in claim 4 wherein said fourth means further comprises a mirror support assembly mounted on said center section for rotative adjustment about said common vertical axis, and means on said mirror support assembly supporting said elongate vertical tubular section for rotative adjustment relative to said mirror support assembly about a second vertical axis spaced from said common vertical axis.

6. A dual mirror assembly for mounting a mirror on the outer side of a vehicle door having a window, said mirror assembly comprising:

(a) a mirror mount having (1) an upper tubular frame member having
  (i) a first horizontal section at one end thereof extending along a first axis and
  (ii) a vertical section at the opposite end thereof extending along a second axis and interconnected to said first section by
  (iii) an intermediate section having a first arcuate portion and a second arcuate section, the first arcuate portion being angularly disposed with respect to the horizontal end section of the upper tubular frame member and the second arcuate section being angularly disposed with respect to the vertical section of the upper frame member,
(2) a lower tubular frame member (a) having straight opposite end sections lying at spaced positions along a common axis and a (b) straight central section extending along a third axis generally parallel to and offset from said common axis, (c) first clamp means adapted to be fixedly mounted on a vehicle door below the window for frictionally gripping one of said straight opposite end sections of said lower frame member with said common axis extending in a generally vertical direction, (d) second clamp means adapted to be fixedly mounted on the vehicle door above the window for frictionally gripping said first horizontal end section of said upper frame member with said first axis extending in a generally horizontal direction, and (e) interengaging means detachably coupling said vertical section of said upper frame member to the other of said opposite end section of said lower frame member with said second axis in coaxial relationship to said first axis and accommodating rotation of said frame members relative to each other about said common axis.

7. A dual outside mirror assembly adapted to be mounted upon a vehicle door having a window, said mirror assembly comprising a tubular upper frame member having a straight horizontal end section at one end and a straight vertical end section at its opposite end horizontally offset from said horizontal section, a tubular lower frame member having straight upper and lower end sections at its opposite ends located at vertically spaced positions on a common vertical axis and an elongate vertical center section joined at its upper and lower ends respectively to said upper and lower end sections in parallel horizontally offset relationship thereto, means coupling said vertical end section of said upper frame member to the upper end section of said lower frame member for pivotal movement relative to said lower frame member about said common vertical axis, first means for mounting the horizontal end section of said upper frame member upon a vehicle door above its window for frictionally resisted rotation relative to the door about the horizontal axis of said horizontal end section; second means for mounting said lower end section of said lower frame member upon the vehicle door below its window for frictionally resisted rotation relative to said door about said common vertical axis; third means for mounting a first and second mirror upon said center section of said lower frame member; wherein said third means comprises a first elongate tubular member, first mirror mounting means mounting said first mirror upon said first elongate tubular member for rotative adjustment relative to said first elongate tubular member about a horizontal axis, a second elongate tubular member, second mirror mounting means mounting the said second mirror on a said second elongate tubular member for rotative adjustment relative to said second elongate tubular member about a horizontal axis; and fourth means for mounting said first and said second elongate tubular members upon said center section of said tubular lower frame member for rotative adjustment relative to said lower frame member about at least one vertical axis wherein said fourth means comprises an elongate vertical tubular section integrally joined at its opposite ends to said first and said second elongate tubular members.

8. The dual mirror of claim 7 wherein said fourth means further comprises a mirror support assembly mounted on said center section for rotative adjustment about said common vertical axis, and means on said mirror support assembly supporting said elongate vertical tubular section for rotative adjustment relative to said mirror support assembly about a second vertical axis spaced from said common vertical axis.

9. A dual mirror mounting assembly comprising:
  (a) an upper frame member, comprising:
    (1) a first section having a linear portion and a substantially J-shaped portion integral therewith;
    (2) a second section having a first linear section which is rotatably interconnected to the J-shaped portion; a second linear section normal to the first linear section, and a third linear section depending from the second section and parallel to the first section;
  (b) a lower frame member comprising:
    (1) a first linear section interconnected to the third linear section of the second section of the upper frame member;
    (2) a second linear section normal to the first linear section and substantially parallel to the second linear portion of the second section of the upper frame member; and
    (3) a third linear section depending from the second linear section and parallel to the first linear section;
  (c) a mirror mount, comprising:
    (a) a rod disposed substantially parallel and proximate to the third linear section of the second section of the upper frame member and the first linear section of the lower frame member;
    (b) a pair of spaced apart reflecting surfaces connected to the rod;
    (c) a pair of spaced apart clamping members, a first clamping member connecting the rod to the third linear section of the second section of the upper frame member and a second clamping member connecting the rod to the first linear section of the lower frame member;
    (d) means for connecting the upper frame member to a door of a vehicle above a window thereof;
    (e) means for connecting the lower frame member to a door of a vehicle below thereof; and
  wherein the rod and the frame members cooperate to dampen vibrations therebetween to reduce vibratory motion of the reflecting surfaces.

* * * * *